Dec. 26, 1967 C. K. FOCHT 3,359,824
LOCKING DEVICE
Filed April 20, 1966 2 Sheets-Sheet 1
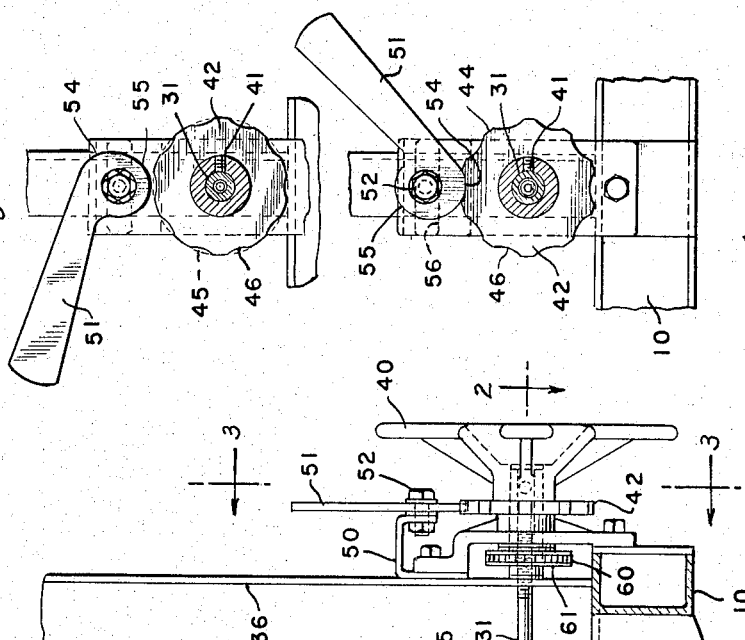
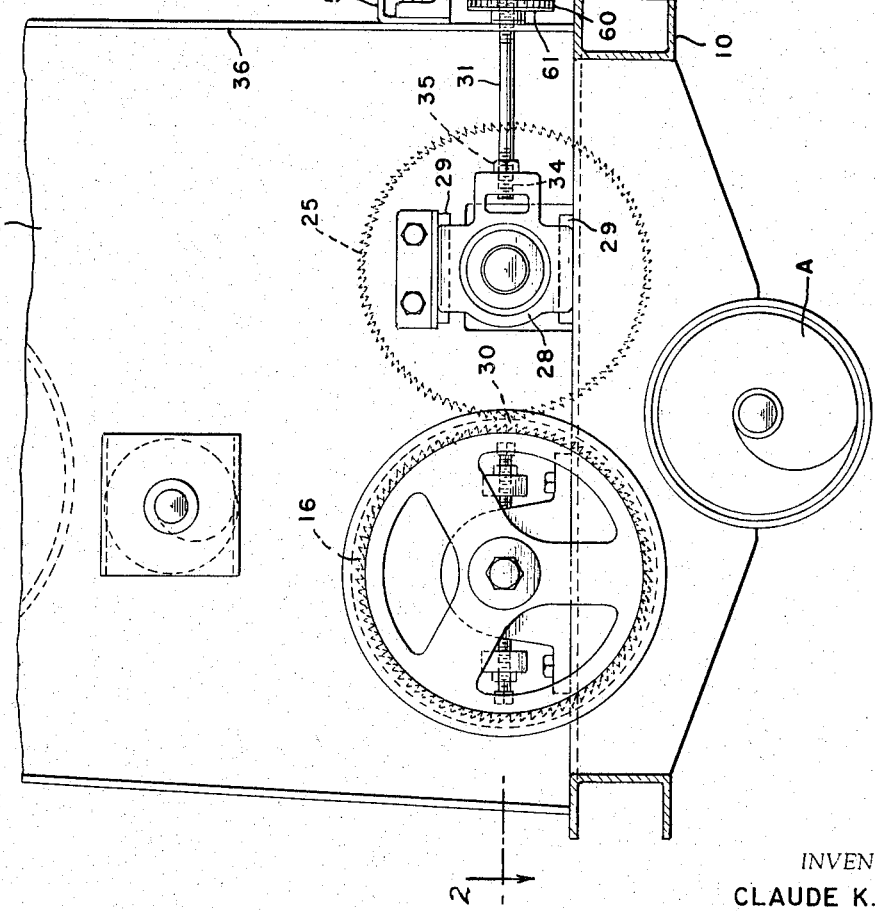
INVENTOR.
CLAUDE K. FOCHT
BY
*Joseph C. G. Brown*
ATTORNEY

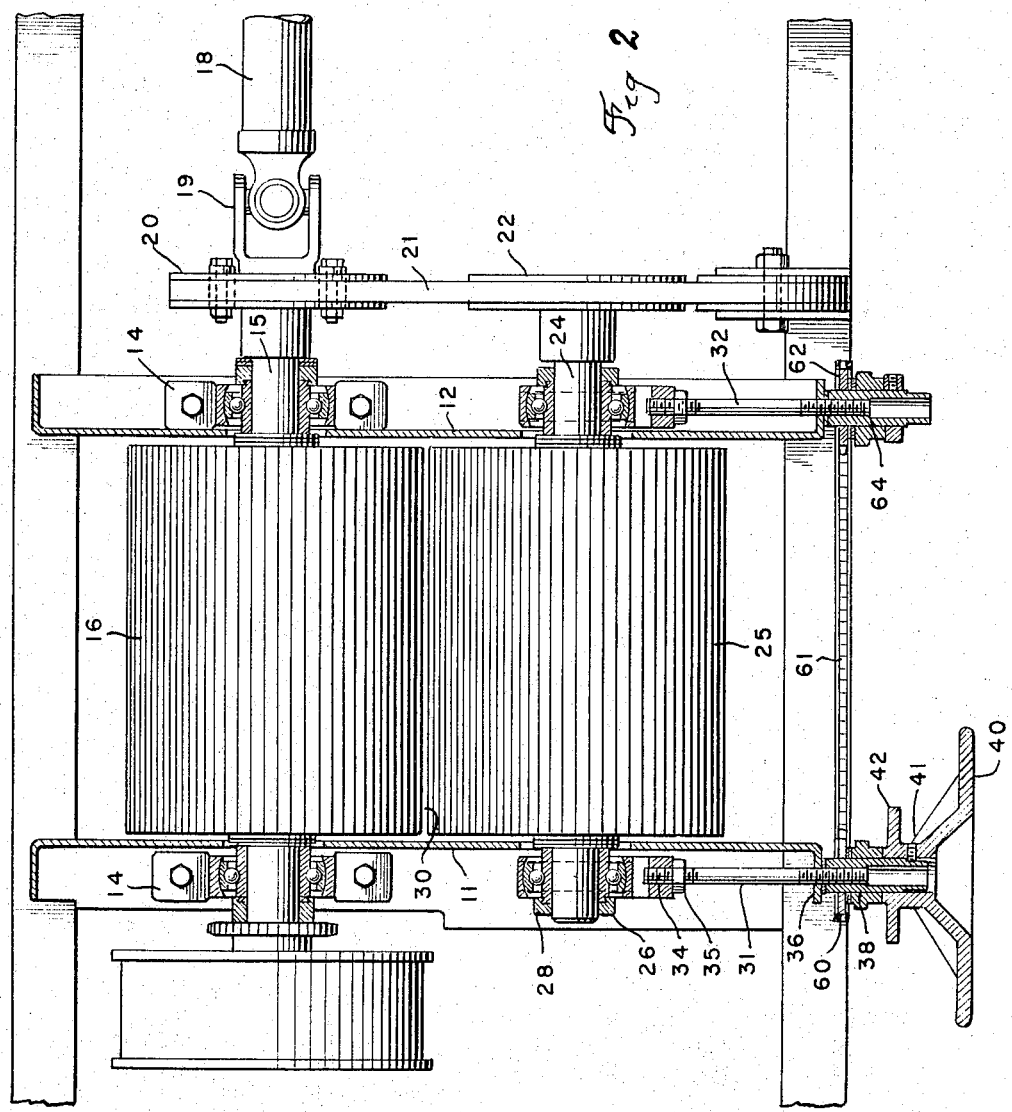

United States Patent Office 3,359,824
Patented Dec. 26, 1967

3,359,824
LOCKING DEVICE
Claude K. Focht, New Holland, Pa., assignor to Sperry Rand Corporation, New Holland, Pa., a corporation of Delaware
Filed Apr. 20, 1966, Ser. No. 543,897
6 Claims. (Cl. 74—527)

This invention relates generally to locking devices and more particularly to a device for locking a screw shaft in a particular position.

In a corn processing machine in which corn kernels are passed between two cracking rolls, it is necessary to precisely position one of the cracking rolls relative to the other so that there is a desired spacing between the rolls. If the rolls are too close together, the corn will be crushed and ground into meal. If the rolls are too far apart, improper cracking will take place. Conventionally, one of the cracking rolls is mounted for rotation on a given fixed axis. The other cooperative roll is mounted on a track for movement toward and away from the fixed roll and in close parallel relation therewith. In a machine of this type, the rolls rotate at substantial speed and there are vibrating forces in the machine frame. Therefore, when the movable cracking roll is properly positioned, it is necessary that it be tightly locked in place so that it will not move after it has been adjusted.

An object of this invention is to provide an improved device to lock a rotatably adjustable screw shaft and to hold the shaft in adjusted position regardless of the vibrations involved.

Another object of this invention is to provide a screw shaft locking device which is easily manually operated without the use of special tools.

Another object of this invention is to provide a locking device of the character described in which cooperative locking elements become wedged, one against the other, whereby rotatable shaft movement is prevented once the parts are locked together.

A still further object of this invention is to provide a locking device in which the components interfit and thereby positively hold a screw shaft against rotation.

A still further object of this invention is to provide a locking device which is relatively simply constructed whereby it may be manufactured and assembled at low cost.

Other objects of this invention will be apparent hereinafter from the specification and from the recital in the appended claims.

In the drawings:

FIG. 1 is an end view of a corn processor machine showing a pair of corn cracking rolls, one of the rolls being adjustable and held in adjusted position by a locking device constructed according to this invention;

FIG. 2 is a plan section taken on the line 2—2 of FIG. 1 looking in the direction of the arrows;

FIG. 3 is a section taken on the line 3—3 of FIG. 1 looking in the direction of the arrows and showing the locking device in locked position; and FIG. 4 is a fragmentary view of FIG. 3 and showing the locking device unlocked.

Referring now to the drawings by numerals of reference, and first particularly to FIGS. 1 and 2, 10 denotes a frame having a pair of laterally spaced vertically extending side walls 11 and 12. Frame 10 carries a pair of pillow blocks 14 which rotatably support the shaft 15 of a first corn cracking roll 16. Roll 16 traverses the space between side walls 11 and 12 and it is rotated in a clockwise direction from the position shown in FIG. 1 by a power-take-off drive 18, including a universal joint 19.

Interposed between universal joint 19 and the adjacent pillow block 14 is a sheave 20 over which a belt 21 extends. Belt 21 passes over a sheave 22 drivingly connected to a shaft 24 parallel to the shaft 15 of roll 16. Shaft 24 rotatably supports a second cracking roll 25 which cooperates with roll 16 to crack corn passed between them. Roll 25 rotates in a counterclockwise direction from the position shown in FIG. 1, and it is supported by bearings 26 carried in elements 28 slidable on track members 29.

The periphery of roll 16 and the periphery of roll 25 are spaced at 30 a distance which is such that corn kernels may pass between the rolls and be properly cracked but not crushed. The cracked corn is discharged to an auger shown at A. To achieve optimum spacing between the rolls, roll 25 is adapted to be adjusted toward and away from roll 16 by means of a pair of adjusting screw shafts 31 and 32 connected to opposite axial ends respectively of shaft 24. Screw shaft 31 has an end 34 which threads into the adjacent bearing support element 28. It is held in place by a lock nut 35. The opposite end of shaft 31 projects through a flange 36 on housing side wall 11 and it has affixed to it a collar 38. Fixedly mounted on collar 38 is an adjustment wheel 40 held in place by means of a set screw 41. Wheel 40 is formed of a casting and it includes a disc 42 which extends in a vertical plane perpendicular to the axis of screw shaft and parallel to the wheel. Disc 42 is of substantially smaller diameter than wheel 40 and it is located inwardly of it.

As shown in FIGS. 3 and 4, disc 42 has a scalloped periphery 44 which generates a circle 45, FIG. 4, when handle 40 is turned and disc 42 is rotated. The scalloped periphery 44 forms arcuate notches 46 each of which is curved on the same length radius. Further, the notches are equally angularly spaced about disc 42, as shown.

Above disc 42 is a bracket 50 which carries a handle 51 operatively engageable with disc 42 to lock screw shaft 31 in rotatably adjusted position. Handle 51 is pivotally supported on a pin 52 and it has a cam portion 54 curved on one radius and an adjacent portion 55 curved on a lesser radius. When handle 51 is in the position shown in FIG. 4 the portion 55 of the handle is adjacent disc 42 and outside of the circle 45 generated by it. When in such location, wheel 40 may be rotated to turn shaft screw 31 to adjust roll 25. When in properly adjusted position, handle 51 may be moved from the position shown in FIG. 4 to the position shown in FIG. 3 to move cam portion 55 into the adjacent notch 46 of disc 42 to lock the parts. The arc of cam 54 is such that it matches and fits snugly into notches 46.

Handle 51 is so mounted relative to disc 42 that when the parts are in locked position, FIG. 3, cam 55 wedges into the particular notch 46 of the disc 42 thereby firmly holding shaft 31 in rotatably adjusted position. Further, the locking will not be impaired by the vibrating forces through the machine when it is operating to crack corn.

It will be also noticed that the pivot pin 52 for the handle 51 is laterally adjustable in a slot 56 in bracket 50. Thus, when the parts are assembled, the handle may be oriented relative to disc 42, so that its cam 55 will properly engage the disc notches.

As shown best in FIG. 2, affixed to collar 38 is a sprocket 60 around which a chain 61 extends. Chain 61 projects around a similar sprocket 62 affixed to a collar 64 on screw shaft 32 for the opposite end of roll 25. Shaft 32 connects to the adjacent bearing element 28. With this arrangement, when wheel 40 is rotatably adjusted to move screw shaft 31 toward or away from cracking roll 16, the rotatable adjustment is transmitted through chain 61 to the opposite end of the structure so that shaft 32 will be simultaneously and correspondingly adjusted. In like respect, when shaft 31 is locked in adjusted position, chain 61 operates to lock shaft 32 in its adjusted position.

The structure described is relatively simple whereby it may be manufactured and assembled at relatively low cost. Nevertheless, the desired precise adjustment of the cracking roll 26 relative to the roll 16 is achieved and the parts may thereafter be securely locked in place unaffected by vibration and the like.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A locking device for a rotatably adjustable screw shaft comprising a disc affixed to said shaft and extending in a plane perpendicular thereto, said disc having a scalloped periphery forming angularly spaced arcuate notches, a handle mounted in the same plane as said disc and being movable about a pivot axis parallel to the axis of said shaft, said handle having a cam at one end and at such a radius from said pivot axis that when said handle is in one position the cam projects into a notch of said disc, and said handle having a second portion adjacent said cam and at such a radius less than the radius of said cam that when said handle is in a second position the cam is withdrawn from said disc and the disc may be freely rotatably adjusted.

2. A locking device as recited in claim 1 wherein said notches are uniformly spaced from each other, each having a surface curved on the same radius, the relative position of said handle to said disc being such that when said cam is in one of said notches there is a wedging between the handle and the disc to securely lock the parts together.

3. A locking device as recited in claim 2 wherein means is provided for supporting said handle for adjustment of said pivot axis relative to said disc so that said cam will properly seat in the notches of the disc.

4. A locking device as recited in claim 2 wherein an adjustment wheel is provided on said shaft in a plane parallel to said disc, said wheel having a larger diameter than said disc and said disc being on the side of the wheel toward said shaft.

5. A locking device as recited in claim 4 wherein said shaft comprises a first shaft, there being a second shaft parallel thereto, sprockets on said shafts and a chain connecting said sprockets whereby when the first shaft is rotatably adjusted said second shaft is simultaneously and correspondingly adjusted.

6. A locking device as recited in claim 2 wherein said shaft is connnected to a corn cracking roll to adjust it relative to a cooperative cracking member, said shaft providing a first shaft connected to one axial end of said roll, there being a second shaft similar and parallel to said first shaft, and sprocket and chain means connecting said shafts whereby when said first shaft is adjusted and then locked, said second shaft is simultaneously adjusted and then locked.

References Cited
UNITED STATES PATENTS

| | | | |
|---|---|---|---|
| 2,714,050 | 7/1955 | Germann | 346—94 |
| 2,809,537 | 10/1957 | Jette | 74—483 |

FRED C. MATTERN, Jr., *Primary Examiner.*

F. D. SHOEMAKER, *Assistant Examiner.*